United States Patent [19]

Fischer

[11] Patent Number: 5,658,522
[45] Date of Patent: Aug. 19, 1997

[54] PROCESS OF AND APPARATUS FOR MAKING PLASTIC ARTICLES

[75] Inventor: Ernst Fischer, Langensendelbach, Germany

[73] Assignee: Mobius & Ruppert, Erlangen, Germany

[21] Appl. No.: 513,794

[22] PCT Filed: Apr. 19, 1994

[86] PCT No.: PCT/DE94/00443

§ 371 Date: Aug. 30, 1995

§ 102(e) Date: Aug. 30, 1995

[87] PCT Pub. No.: WO94/23927

PCT Pub. Date: Oct. 27, 1994

[30] Foreign Application Priority Data

Apr. 21, 1993 [DE] Germany .......................... 43 13 015.1

[51] Int. Cl.$^6$ .......................... B29C 45/26; B29C 45/66
[52] U.S. Cl. .................... 264/328.7; 425/547; 425/548; 425/573; 425/592; 425/593
[58] Field of Search .............................. 264/294, 328.7; 425/451.5, 451.6, 547, 548, 555, 573, 592, 593

[56] References Cited

U.S. PATENT DOCUMENTS 4,751,029  6/1988  Swanson ........................ 425/451.5 X

FOREIGN PATENT DOCUMENTS

| 403 816 | 12/1990 | European Pat. Off. . |
| 41 08 236 | 8/1992 | Germany . |
| 58-39425 | 3/1983 | Japan ................................. 264/328.7 |
| 2034630 | 6/1980 | United Kingdom .................... 425/592 |

OTHER PUBLICATIONS

Friedrichs, et al., "Spritzprägen dünnwandiger thermoplastischer Formteile", *Kunststoffe*, May 1990, pp. 583–587.
Abstract of Japan 59–42,933 (Published Mar. 9, 1984).
Abstract of Japan 61–95,917 (Published May 14, 1986).

*Primary Examiner*—Leo B. Tentoni
*Attorney, Agent, or Firm*—Hoffmann & Baron, LLP

[57] ABSTRACT

A process and an apparatus (10) for the production of a plastic article of large area and small wall thickness, wherein the plastic material (90) is injected in the viscous condition into a mold cavity which is defined by a bottom mold portion (20) and a top mold portion (36). During the operation of injection of the viscous plastic material, which takes place through an inlet (76), the top mold portion (36), with the bottom mold portion (20), forms a pre-molding cavity (86) which is enlarged in a wedge shape starting from the inlet (76). During injection of the viscous plastic material (90) into the pre-molding cavity (86) or immediately after the injection operation, the bottom and top mold portions (20, 36) are moved relatively towards each other, forming the definitive mold cavity (78), so that the viscous plastic material is uniformly distributed in the diminishing mold cavity.

14 Claims, 6 Drawing Sheets

PROCESS OF AND APPARATUS FOR MAKING PLASTIC ARTICLES

FIELD OF THE INVENTION

The invention concerns a process and an apparatus for the production of a plastic article of a large area and a small wall thickness, wherein the plastic material is injected in the viscous condition through at least one inlet which opens into a mold cavity. The mold cavity which corresponds to the plastic article is defined by a bottom mold portion and a top mold portion and the bottom and top mold portions are moved away from each other after the plastic material has set for removal of the fully molded plastic article, wherein the top mold portion with the bottom mold portion forms a premolding cavity during the operation of injection of the viscous plastic material and immediately after termination of the injection operation the bottom mold portion and the top mold portion are moved relatively towards each other forming the definitive mold cavity, so that the viscous plastic material is distributed in the diminishing mold cavity.

BACKGROUND OF THE INVENTION

A process and an apparatus for the production of a plastic article having high-precision surface structures and/or high-luster surfaces is known from the present applicants' DE 41 08 236 C1. That known apparatus involves a not inconsiderable level of machine expenditure, and that has an effect on the production costs of the plastic articles produced with that apparatus or by means of that process. The specified plastic articles are for example Fresnel lenses of a highly transparent plastic material. The plastic material used is preferably PMMA.

A process and an apparatus of the kind set forth in the opening part of this specification are known from the German journal: "Kunststoffe" 80 (1990), issue 5, pages 583 to 587.

Therein the reduction of the mold cavity from the pre-molding cavity to the definitive mold cavity which corresponds to the plastic article to be produced is effected by a linear movement of the mold portions relative to each other in such a way that the mold cavity between the top mold portion and the bottom mold portion diminishes in parallel relationship. In that situation the viscous plastic material introduced into the pre-molding cavity is uniformly distributed from the centrally disposed inlet on all sides, that is to say in all directions, perpendicularly to the injection direction. That requires a certain amount of force and energy to be applied, as well as involving a considerable level of expenditure in terms of machinery or apparatus.

The object of the present invention is to provide a process and an apparatus of the kind set forth in the opening part of this specification, wherein it is possible, at a comparatively low level of machine expenditure, inexpensively to produce plastic articles of large area and small wall thickness, enjoying good optical properties.

SUMMARY OF THE INVENTION

In terms of the process, for the production of a flat plastic article of large area, the plastic material is introduced through a lateral inlet into a pre-molding cavity which is enlarged in a wedge shape starting from the inlet, the wedge shape of the premolding cavity being abolished in order to form the definitive mold cavity. In this case therefore closing movement of the top mold portion and the bottom mold portion can take place in term of time with or after the beginning of the injection operation and can be concluded with or shortly after the termination of the injection operation. The best times for the commencement and the conclusion of the closing movement are dependent on the flow path and the wall thickness of the plastic material and can be ascertained by tests.

In the process according to the invention therefore the viscous plastic material is introduced into a pre-molding cavity which is of larger volume in comparison with the definitive mold cavity that corresponds in terms of shape to the plastic article and which is enlarged in a wedge shape from the inlet, the plastic material being introduced into the pre-molding cavity from the edge region which is of small internal height, so that the viscous plastic material, starting from the inlet, can flow into the pre-molding cavity without any problem. Simultaneously with the step of injecting the plastic material or immediately after termination of the injection operation, the top mold portion and the bottom mold portion are moved relatively towards each other in such a way that the wedge shape of the pre-molding cavity is gradually nullified, that is to say the pre-molding cavity is reduced in size, that is to say changed, into the definitive mold cavity which corresponds to the plastic article, and at the same time the viscous plastic material in the mold cavity is uniformly distributed. That can avoid stress striae or streaks due to a variation in refractive index, interference phenomena or other optical non-homogeneities as well as curvature effects resulting from the material memory, in respect of the large-area, small-gauge plastic article, and this is particularly advantageous especially in relation to plastic articles of large area which are for example in the form of lenticular screens or in the form of Fresnel lenses. It will be appreciated that the process according to the invention can also be used for the simultaneous production of a suitable number of drawing rulers, drawing stencils or the like. While the use of per se conventional technologies make it possible to produce plastic articles with a surface area of the order of magnitude of 750 cm$^2$ with a minimum wall thickness or gauge of 2.2 mm with a 250 t-press, which for example corresponds to eight drawing rulers, it is possible in accordance with the invention to produce plastic articles whose area is 31 cm×31 cm=960 cm$^2$, while a wall thickness of the order of magnitude 1.4 mm can be achieved. The process according to the invention however affords the considerable advantage that the injection pressure or the closing pressure can be comparatively low. It is therefore highly suitable for the production of Fresnel lenses with surface area dimensions of the order of magnitude of 31 cm×31 cm, with a core wall thickness of the order of magnitude of 1.9 mm and an overall wall thickness of the order of magnitude of 2.25 mm.

A process which is simple to carry into effect is afforded in accordance with the invention if the top mold portion and the bottom mold portion are pivoted together about a common mold portion connecting axis, while or immediately after the viscous plastic material is introduced, through the inlet which passes through the mounting axis, into the mold cavity which reduces in size to give the definitive mold cavity.

In terms of the apparatus, the object of the present invention is solved, in conjunction with the classifying portion of claim 3, in that the bottom mold portion and the top mold portion are pivotably movably connected to each other by means of a mold portion connecting axis which is provided at the injection end of the mold portions and through which the inlet extends. Such a design configuration for the apparatus according to the invention affords the advantage that the bottom mold portion and the top mold portion can provide a pre-molding cavity which starts from the mold portion connecting axis and which enlarges in a wedge shape and into which a suitable viscous plastic material can be introduced through the inlet which extends through the mold portion connecting axis. Simultaneously with the introduction of the viscous plastic material or immediately after termination of the introduction thereof, the bottom mold portion and the top mold portion are pivoted together about the common mold portion connecting axis, in which case the wedge-shaped pre-molding cavity is converted into the definitive mold cavity and at the same time the viscous plastic material which has been introduced into the pre-molding cavity is uniformly distributed in the mold cavity. In that situation, the introduction of the viscous plastic material into the pre-molding cavity and in addition uniform distribution of the viscous plastic material when the two mold portions are pivoted together is facilitated and optimised by virtue of the pre-molding cavity which is enlarged in a wedge shape, so that it is possible to produce large-area plastic articles for example with a high-precision surface structure and/or with a high-luster surface and with excellent optical properties, because stress striae or streaks due to changes in refractive index, interference phenomena or other optical non-homogeneities are prevented in a relatively simple manner. A further advantage is that the pressing pressure can be comparatively low, which means that it is possible even with relatively small presses to produce plastic articles of large area and of small wall thickness.

It has been found desirable if the bottom mold portion is fixed to a base member and the top mold portion is fixed by means of a pivot connecting arrangement to a mounting member which is linearly displaceable in respect of height, in relation to the base member. For that purpose, columns along which the mounting member is displaceable in respect of height can be provided on the base member. The base member with the columns and the mounting member disposed displaceably in respect of height along the columns can be parts of a per se known press so that the level of capital investment for an apparatus according to the invention is comparatively low.

The connecting arrangement preferably has a first fixing member which is fixed or can be fixed to the top mold portion, a second fixing member which is fixed or can be fixed to the mounting member, and, between the first and second fixing members, an intermediate member which is pivotably movably connected to the first fixing member by means of a first pivot axis and to the second fixing member by means of a second pivot axis, wherein the first and second pivot axes are oriented parallel to each other and to the mold portion connecting axis. Such a configuration of the apparatus according to the invention affords the advantage that a linear movement of the mounting member relative to the base member produces a corresponding pivotal movement of the top mold portion about the mold portion connecting axis, with respect to the bottom mold portion, the pressing force of the mounting member being transmitted to the top mold portion. As said pressing force is relatively high, that is to say it can be of the order of magnitude of for example 250 tonnes, it is advantageous if the first pivot axis is in contact over a large area with the first fixing member and with the intermediate member, if the second pivot axis is in contact over a large area with the second fixing member and with the intermediate member, and if the mold portion connecting axis is in contact over a large area with the top mold portion and the bottom mold portion.

A very uniform feed of the viscous plastic material into the pre-molding cavity which is enlarged in a wedge shape is possible if the inlet which is provided in the mold portion connecting axis, on the side which is towards the mold cavity, is formed with a slit passage which enlarges in a fan-like configuration, while at the side remote from the slit passage, the inlet is provided with a centering portion for an injection nozzle. In the apparatus according to the invention, the inlet provided in the mold portion connecting axis, or the slit passage which enlarges in a fan shape at the front side thereof, is desirably disposed in such a way that, in the closed condition of the mold, the inlet is closed by the top mold portion so that plastic material is prevented from flowing back into the inlet. In the closed condition of the mold the mold cavity is therefore sealingly closed at all sides. It is helpful for that purpose if the bottom mold portion or the top mold portion is formed with a collar which delimits the mold cavity at three sides and if the mold portion connecting axis is provided at the fourth side of the mold cavity.

It has been found advantageous if the bottom mold portion and/or the top mold portion is provided with a heating or temperature-control means and/or with a cooling means. By virtue of the heating or temperature-control means, it is possible for the tool temperature to be regulated in the optimum fashion in order to be able to produce satisfactory parts, The particular manner of filling the mold, by way of an umbrella-like feed outlet, together with the particular closing movement of the tool which is opened in a wedge-like shape, provides for linear filling of the tool with a straight flow leading edge, and that results in parts which have a particularly low level of stress and which have little sensitivity to distortion.

BRIEF DESCRIPTION OF THE DRAWINGS

An embodiment of the invention is described hereinafter and illustrated in the drawing in which.

DETAILED DESCRIPTION OF THE INVENTION

Figure 1:
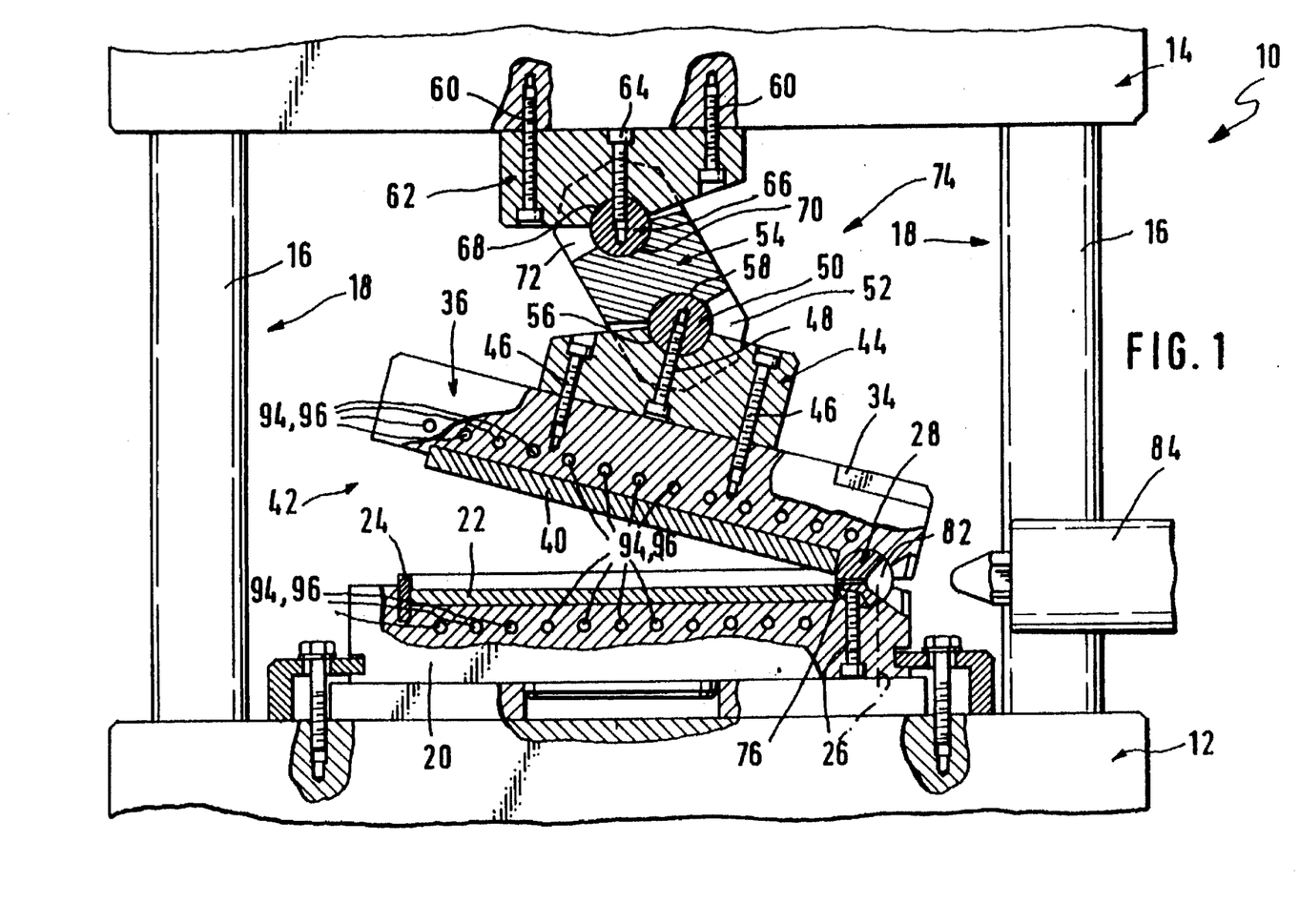
FIG. 1 is a partly cut-away front view of the apparatus in the opened condition.

FIG. 1 shows an apparatus 10 having a base member 12 of which a portion is shown, and a mounting member 14 of which a portion is shown and which is movable relative to the base member 12 along pillars 16 of a pillar guide arrangement 18.

A bottom mold portion 20 is fixed to the base member 12. The bottom mold portion 20 has an insert portion 22 and a collar 24 which delimits the insert portion 22 and three sides. The collar 24 projects beyond the insert portion 22 and beyond the bottom mold portion 20.

A mold portion connecting axis 28 is fixed to the bottom mold portion 20 by means of fixing elements 26. FIG. 1 shows only one fixing element 26, only the center line of a second fixing element 26 being shown in FIG. 1. It will be seen from FIG. 5 that the mold portion connecting axis 28 is fixed to the bottom mold portion 20 at each of the two mutually remote end portions 30 of the connecting axis 28, by respective groups of four fixing elements 26. The two end portions 30 of the mold portion connecting axis 28 project beyond the bottom mold portion 20 with journals 32 which are mounted in hinge member 34 which are fixed to a top mold portion 36 by means of fixing elements 38 of which two fixing elements 38 are visible in FIG. 4.

The top mold portion 36 which is provided with a matrix or die 40 is therefore pivotably movably connected to the bottom mold portion 20 by means of the mold portion connecting axis 28. FIG. 1 showing the apparatus 10 in an opened position. In that opened position, it is possible for a fully molded plastic article to be removed from the apparatus 10 or from the mold 42 consisting of the bottom mold portion 20 and the top mold portion 36.

A first fixing member 44 is fixed to the top mold portion 36 by means of fixing elements 46. A first pivot axis 50 is fixed to the first fixing member 44 by means of fixing elements 48. The pivot axis 50 projects with its two mutually remote end portions beyond the first fixing member 44. The said projecting end portions of the first pivot axis 50 are mounted in plates 52 which project downwardly laterally from the intermediate member 54. The first fixing member 44 is provided with a part-cylindrical sliding or contact surface 56 which is adapted to the first pivot axis 50. The intermediate member 54 is provided with a similar part-cylindrical sliding or contact surface 58 which is adapted in shape to the first pivot axis 50 so that there is contact over a large area between the intermediate member 54, the first pivot axis 50 and the first fixing member 44 respectively.

A second fixing member 62 is fixed to the mounting member 14 of the apparatus 10 by means of fixing elements 60. A second pivot axis 66 is fixed to the second fixing member 62 by means of fixing elements 64. The second fixing member 62 is provided with a part-cylindrical contact surface 68 which is adapted in shape to the second pivot axis 66 and the intermediate member 54 is provided with a part-cylindrical sliding or contact surface 70 which is adapted in shape to the second pivot axis 66. Like the first pivot axis 50, the second pivot axis 66 projects with its two mutually remote end portions beyond the second fixing member 62. The said two projecting end portions of the second pivot axis 66 are mounted in plates 72 which project upwardly laterally from the intermediate member 54.

The first and second fixing members 44 and 62 and the intermediate member 54 thus form, jointly with the two pivot axes 50 and 66, a pivot connecting arrangement 74. Because the two pivot axes 50 and 66 are oriented parallel to each other and to the mold portion connecting axis 28, an upward and downward movement of the mounting member 14 relative to the base member 12 produces an opening and closing movement respectively of the top mold portion 36 in relation to the bottom mold portion 20.

The insert member 22 and/or the matrix or die 40 can be designed with a structure in order, with the apparatus 10, to produce a correspondingly structured flat plastic article of large dimensions in terms of surface area, and involving a comparatively small wall thickness or gauge.

Figure 5:
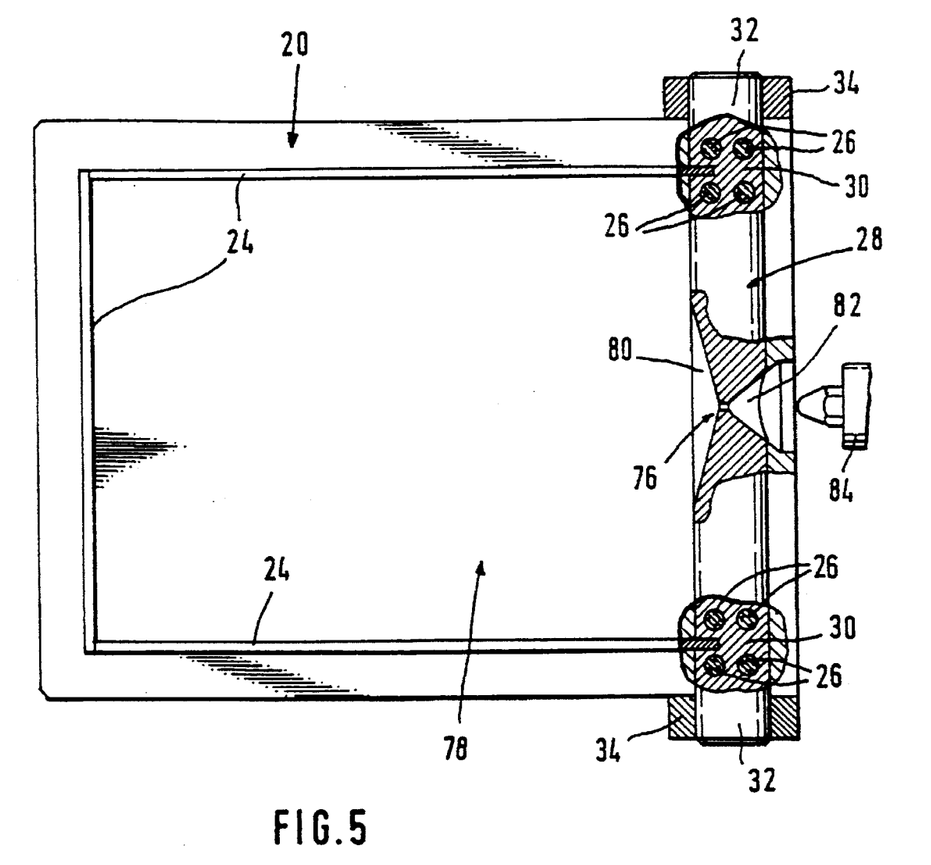
FIG. 5 is a partly cut-away view of the bottom mold portion and the mold portion connecting axis, viewing from above.

Extending through the mold portion connecting axis 28 is an inlet 76 which—as can be seen in particular from FIG. 5 can be provided with a slit passage 80 which is enlarged in a fan-like configuration, on the side that is towards the mold cavity 78. On the side that is remote from the slit passage 80, the inlet 76 is desirably formed with a centering portion 82 which serves to center a plastic material injection nozzle 84, of which a part is illustrated. The centering portion 82 of the inlet 76, which is provided in the mold portion connecting axis 28, opens in the cavity which is defined by the bottom mold portion 20 and the top mold portion 36 of the mold 42.

Figure 2:
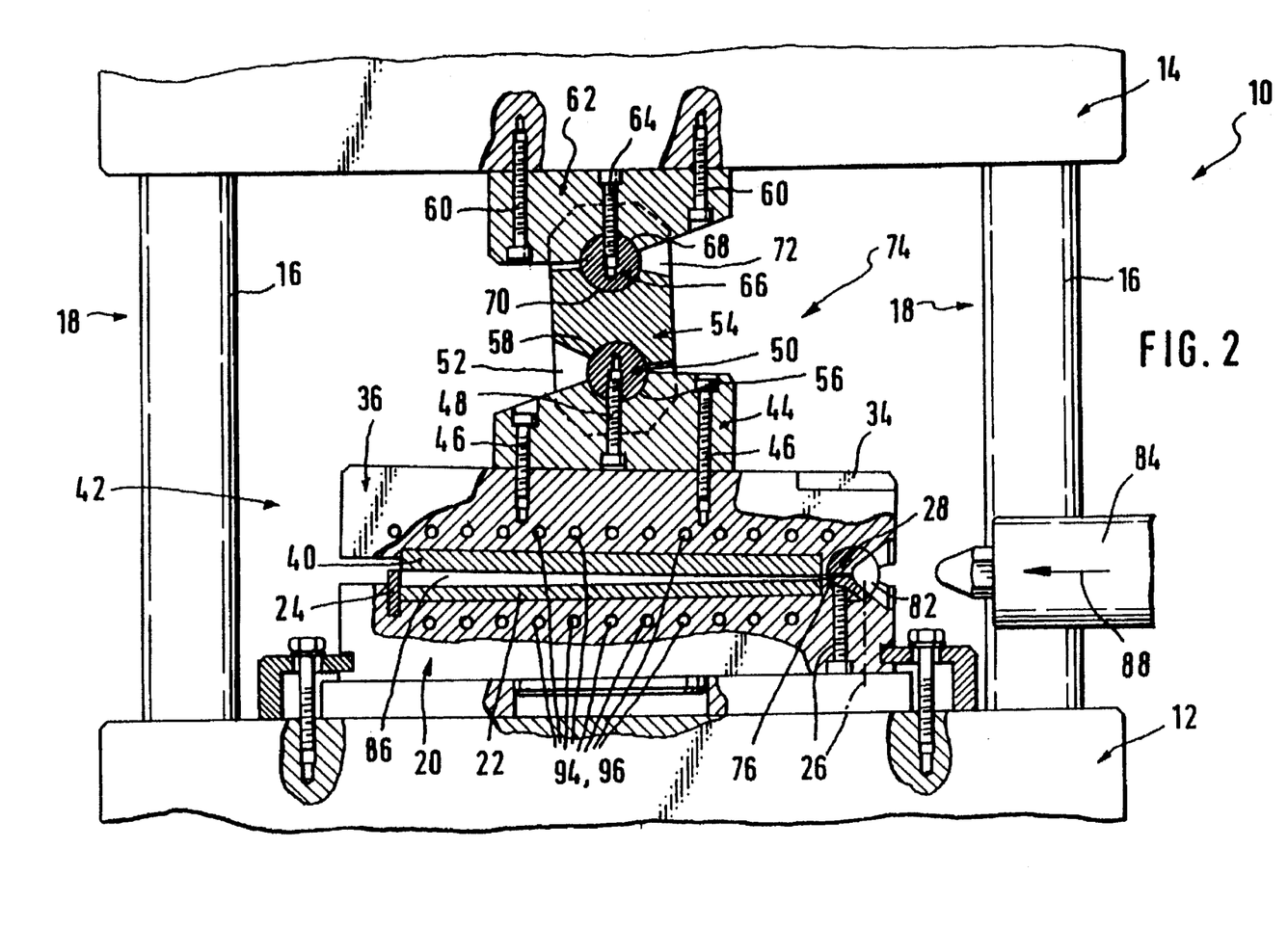
FIG. 2 is a view similar to FIG. 1 showing the apparatus in a partly closed position of the bottom mold portion and the top mold portion for forming a pre-molding cavity, prior to the beginning of the injection operation.
Figure 4:
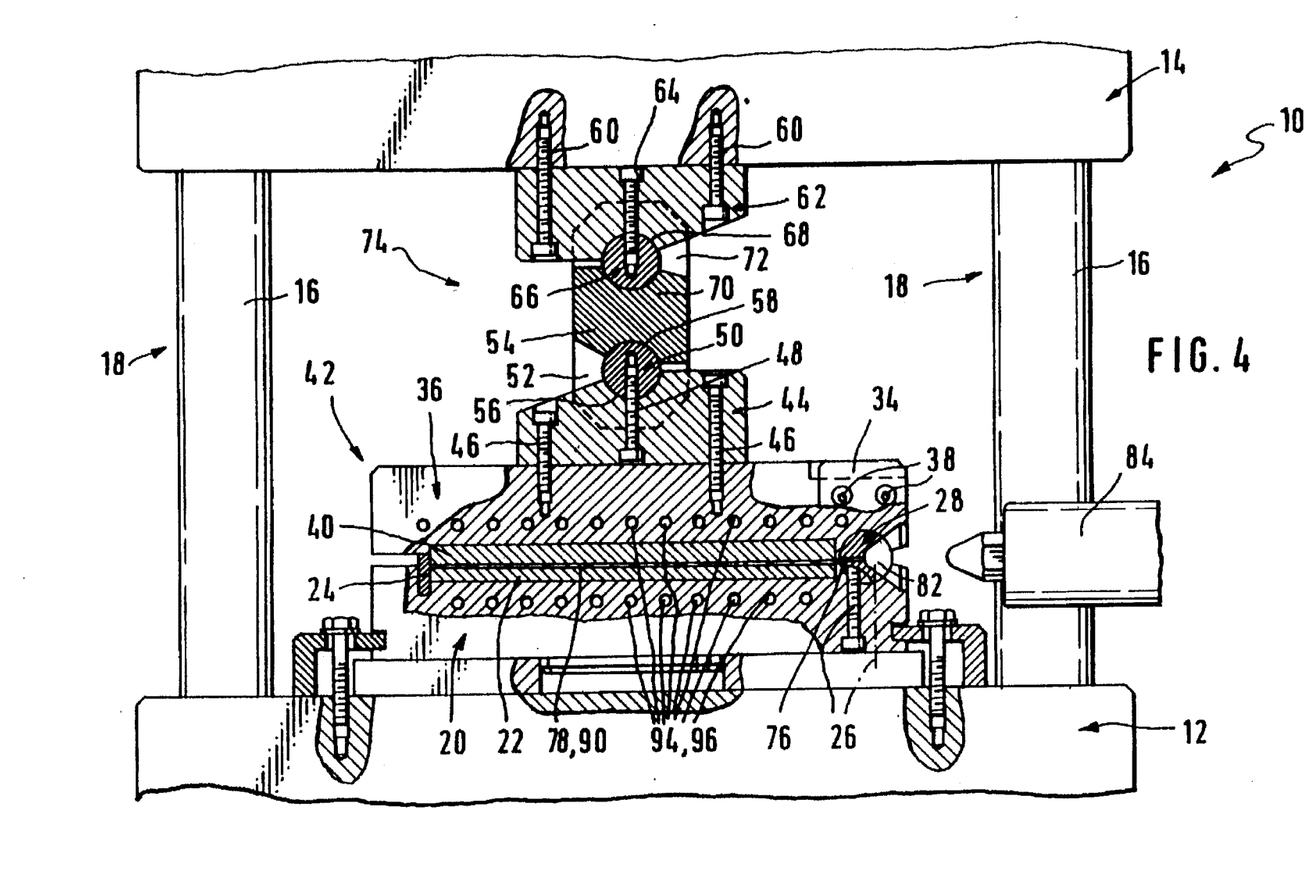
FIG. 4 is a view similar to FIGS. 1 and 2 showing the apparatus in the closed working position in which the top mold portion and the bottom mold portion define the mold cavity which is closed at all sides and which corresponds to the plastic article of large area and small wall thickness, that is to be produced.

The top mold portion 36 with the matrix or die 40 is of such a configuration, in the vicinity of the mold portion connecting axis 28, that the inlet 76 is not closed in the opened position of the mold 42 as shown in FIG. 1 and in the position of the mold 42 which is shown in FIG. 2 and in which a pre-molding cavity 86 is established between the matrix or die 40 and the insert member 22 while the inlet 76 is closed off in the working position of the mold 42 which is shown in FIG. 4 and in which the mold cavity 78 corresponding to the plastic article to be produced is defined in the mold 42.

Figure 3:
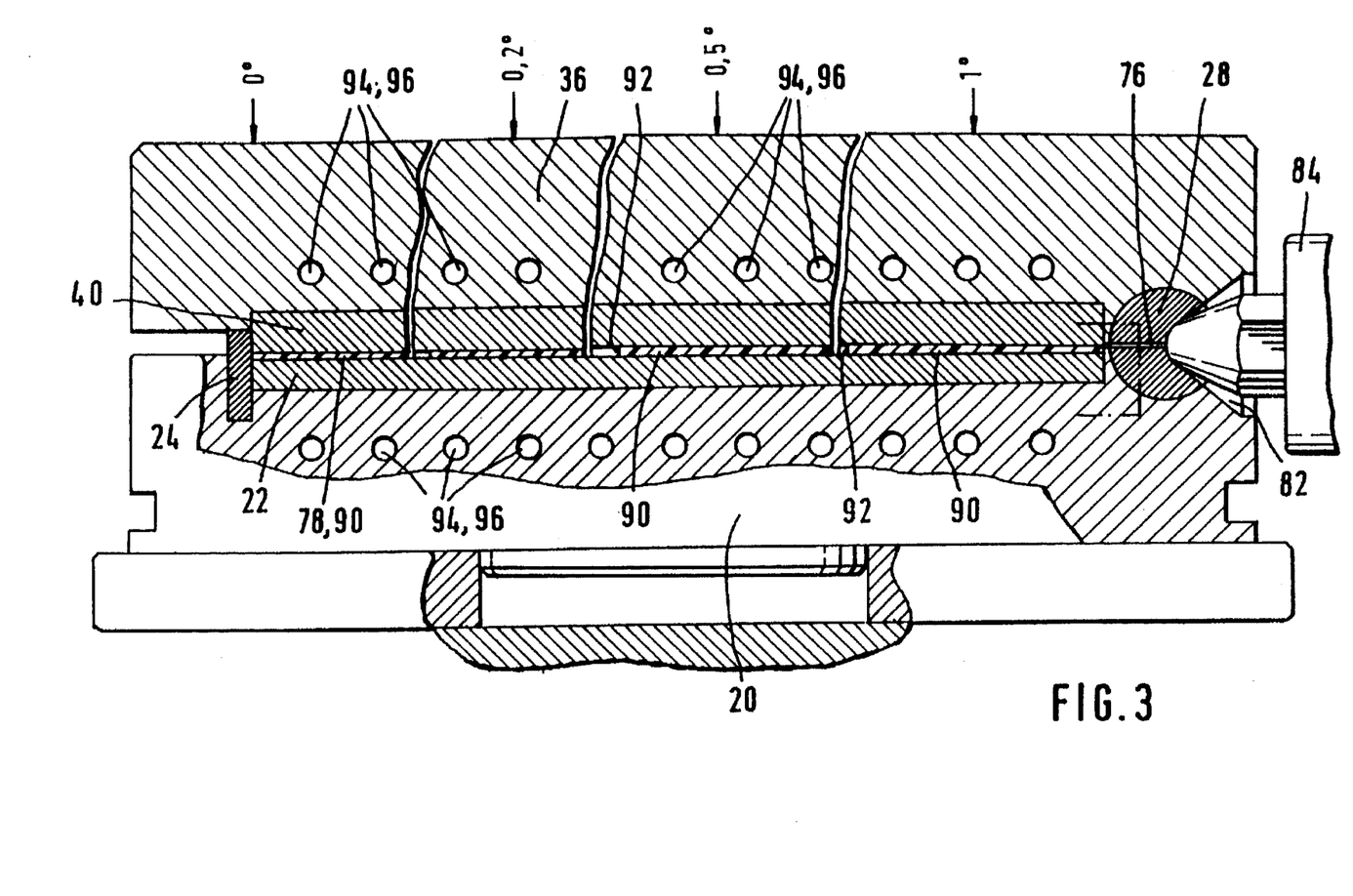
FIG. 3 is a partly cut-away functional view of three successive intermediate positions, which are enlarged in a wedge shape, of 1°, 0.5°, 0.2° and 0°, as well as the leading flow edge, and the closure position, which follows in respect of time, of the top mold portion relative to the stationary bottom mold portion.

FIG. 2 in which the same details are denoted by the same references as in FIG. 1 shows the pre-molding cavity 86 which enlarges in a wedge shape, starting from the inlet 76. At its underside, the pre-molding cavity 86 is delimited by the insert member 22, at its top side it is delimited by the matrix or die 40, and at three sides of its peripheral edge it is delimited by the collar 24. On the fourth side, the premolding cavity 86 is delimited by the top mold portion 36 or by the mold portion connecting axis 28 with its inlet 76. When the mold 42 is in the working position shown in FIG. 2, the injection head 84 is moved into the centering portion 82 of the mold portion connecting axis 28, as is indicated by the arrow 88 in FIG. 2. Then, viscous plastic material is injected through the inlet 76 into the pre-molding cavity 86 which enlarges in a wedge-like configuration, and at the same time or immediately thereafter, the top mold portion 36 is pivoted in the counter-clockwise direction about the mold portion connecting axis 28 by means of the mounting member 14, by way of the pivot connecting arrangement 74, so that the wedge shape of the pre-molding cavity 86 is correspondingly reduced and at the same time, the viscous plastic material introduced into the pre-molding cavity 86 through the inlet 76 is uniformly distributed into the mold cavity, away from the region of the inlet 76. This is diagrammatically illustrated in FIG. 3 which indicates three successively diminishing wedge-like intermediate positions of the pre-molding cavity, and the final closed position. In the intermediate positions of the pre-molding cavity the wedge angles are 1°, 0.5° and 0.2° respectively. The angle 0° identifies the final position in which the mold cavity 78 which is completely filled with plastic material 90 is formed between the matrix or die 40 and the insert member 22. Therefore, as the wedge angle decreases, the plastic material 90, that is to say its leading edge 92 which is remote from the inlet 76, is urged increasingly further away from the inlet 76 into the corresponding pre-molding cavity 86 until ultimately the plastic material 90 fills the entire definitive mold cavity 78. This is also illustrated in FIG. 4. It will also be seen from FIGS. 3 and 4 that, when the mold 42 is in the closed condition, the inlet 76 which extends through the mold portion connecting axis 28 is sealingly closed by the top mold portion 36 so that unintended return flow of plastic material from the mold cavity 78 into the inlet 76 is prevented.

Figure 6:
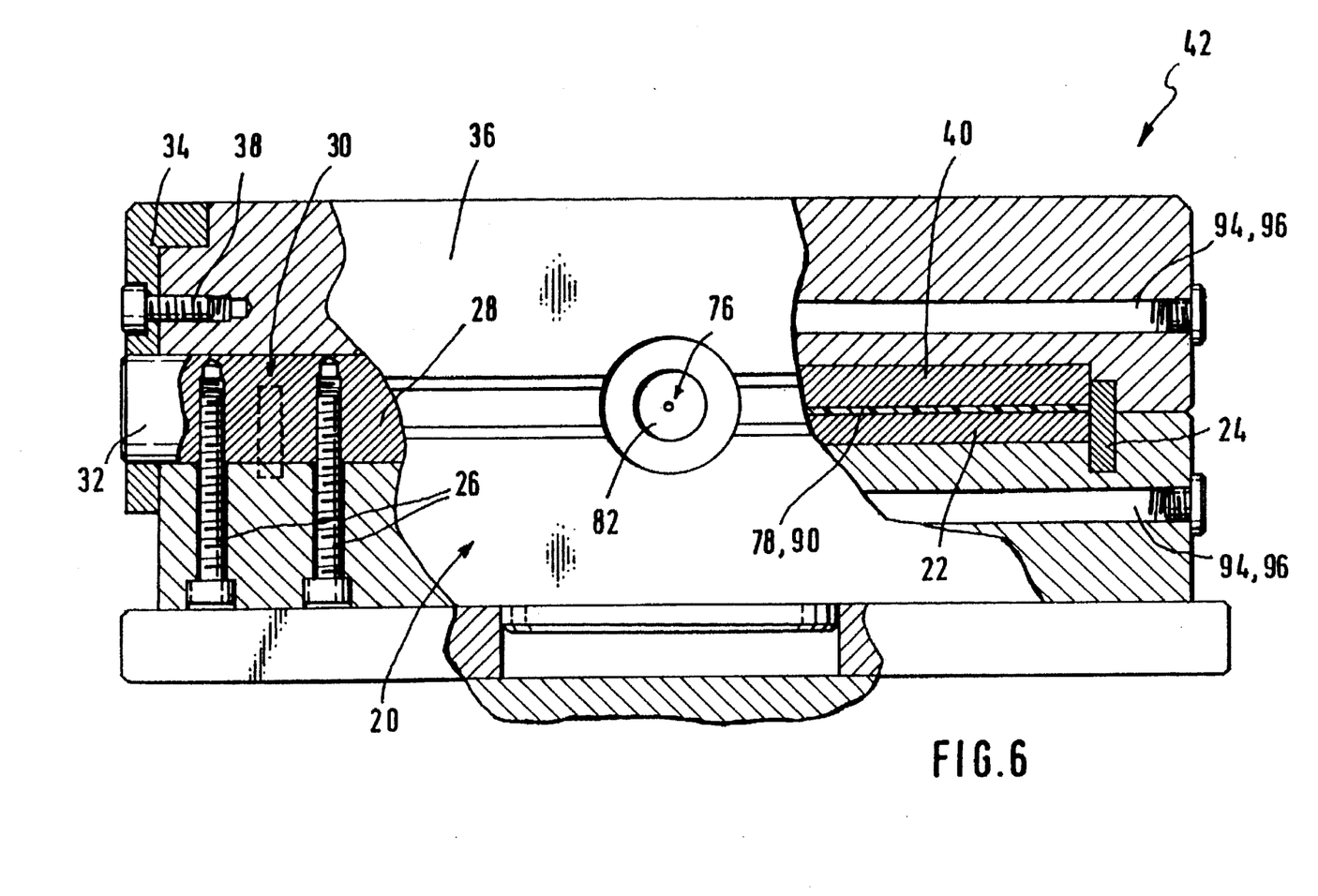
FIG. 6 is a partly cut-away view of the top mold portion and the bottom mold portion, in the closed condition, viewing from the injection side.

The bottom mold portion 20 and/or the top mold portion 36 are desirably provided with a heating or temperature-control means 94 and/or with a cooling means 96, as can also be clearly seen from FIG. 6.

I claim:

1. A process for producing a plastic article wherein the plastic material is injected in a viscous condition through at least one inlet into a mold cavity defined by a bottom mold portion and a top mold portion wherein the bottom and top mold portions are moved away from each other after the plastic material has set for removal of the plastic article, wherein the top mold portion with the bottom mold portion forms a wedge-shaped pre-molding cavity during the operation of injection of the viscous plastic material, and immediately after termination of the injection operation the bottom mold portion and the top mold portion are moved relatively towards each other, forming the definitive mold cavity, so that the viscous plastic material is distributed in the diminishing mold cavity to form a flat plastic article having a large surface area, and a predetermined thickness, wherein the plastic material is introduced through the inlet into the pre-molding cavity which is enlarged in a wedge shape starting from the inlet, the wedge shape of the pre-molding cavity diminishing upon the formation of the definitive mold cavity.

2. A process as set forth in claim 1, wherein the top and bottom mold portions are pivoted together about a common mold portion connecting axis, while or immediately after the viscous plastic material is injected through the inlet which passes through the mold portion connecting axis into the mold cavity which decreases in size to provide the definitive mold cavity.

3. Apparatus for the production of a plastic article of a large area and small wall thickness, comprising a bottom mold portion and a top mold portion defining a mold cavity which corresponds to the plastic article and into which an inlet for viscous plastic material laterally opens, wherein the bottom mold portion and the top mold portion are pivotably movably connected to each other by means of a mold portion connecting axis which is provided at the injection end of the top and bottom mold portions and wherein the inlet extends through the mold portion connecting axis.

4. Apparatus as set forth in claim 3, wherein the bottom mold portion is fixed to a base member and the top mold portion is fixed by means of a pivot connecting arrangement to a mounting member which is linearly movable in relation to the base member.

5. Apparatus as set forth in claim 4, wherein the base member is provided with pillars along which the mounting member is displaceable.

6. Apparatus as set forth in claim 3, wherein the pivot connecting arrangement has a first fixing member which is fixed to the top mold portion, a second fixing member which is fixed to the mounting member and, between the first and second fixing members, an intermediate member which is pivotably movably connected to the first fixing member by means of a first pivot axis and to the second fixing member by means of a second pivot axis wherein the first and second pivot axes are oriented parallel to each other and to the mold portion connecting axis.

7. Apparatus as set forth in claim 6, wherein the first pivot axis is in contact with the first fixing member and with the intermediate member wherein the second pivot axis is in contact with the second fixing member and with the intermediate member, and wherein the mold portion connecting axis is in contact with the top mold portion and with the bottom mold portion.

8. Apparatus as set forth in claim 3, wherein the inlet which is provided in the mold portion connecting axis, on the side towards the mold cavity, is formed with a slit passage that enlarges in a fan-like configuration, and at the side remote from the slit passage the inlet is provided with a centering portion for an injection head.

9. Apparatus as set forth in claim 3, wherein the bottom mold portion or the top mold portion is provided with a collar which delimits the mold cavity at three sides and the mold portion connecting axis is provided at the fourth side of the mold cavity.

10. Apparatus as set forth in claim 3, wherein one of the bottom mold portion and the top mold portion is provided with one of a heating means, or temperature-control means and cooling means.

11. Apparatus as set forth in claim 3, wherein the inlet is provided at the narrowest location of the pre-molding cavity which is wedge-shaped in the injection condition.

12. Apparatus as set forth in claim 3, further comprising additional inlets along the mold portion connecting axis.

13. Apparatus as set forth in claim 3, wherein the mold portion connecting axis is a hot passage system through which thermoplastic material is injected into the wedge-shaped pre-molding cavity, at a plurality of locations.

14. A process of producing a plastic article, comprising the steps of:

injecting a plastic material through an inlet into a wedge-shaped pre-molding cavity, said pre-molding cavity being defined by a top mold portion and a bottom mold portion;

moving the top mold portion and bottom mold portion relatively towards each other immediately after termination of the injecting step thereby forming a definitive mold cavity substantially corresponding to the plastic article being formed, the plastic material being distributed within the definitive mold cavity and wherein the pre-molding cavity diminishes in size upon the formation of the definitive mold cavity; and moving the top mold portion away from the bottom mold portion after the plastic material has set for removal of the plastic article.

* * * * *